(12) United States Patent
Peng et al.

(10) Patent No.: US 11,907,668 B2
(45) Date of Patent: Feb. 20, 2024

(54) METHOD FOR SELECTING ANNOTATED SAMPLE, APPARATUS, ELECTRONIC DEVICE AND STORAGE MEDIUM (71) Applicant: BEIJING BAIDU NETCOM SCIENCE TECHNOLOGY CO., LTD., Beijing (CN)

(72) Inventors: Minlong Peng, Beijing (CN); Mingming Sun, Beijing (CN); Ping Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/148,904

(22) Filed: Dec. 30, 2022

(65) Prior Publication Data

US 2023/0146519 A1 May 11, 2023

(30) Foreign Application Priority Data

Feb. 9, 2022 (CN) .......................... 202210122790.5

(51) Int. Cl.
*G06F 17/00* (2019.01)
*G06F 40/30* (2020.01)
*G06F 18/24* (2023.01)

(52) U.S. Cl.
CPC .............. *G06F 40/30* (2020.01); *G06F 18/24* (2023.01)

(58) Field of Classification Search
CPC ........... G06F 40/30; G06F 16/35; G06F 18/24
See application file for complete search history.

(56) References Cited

U.S. PATENT DOCUMENTS 11,227,120 B2 * 1/2022 Abudalfa .............. G06F 40/279
2017/0220578 A1 8/2017 Kazi et al.
(Continued)

FOREIGN PATENT DOCUMENTS

CN 103020249 A 4/2013
CN 105205124 A 12/2015
(Continued)

OTHER PUBLICATIONS

Office Action issued in Chinese Application No. 202210122790.5, dated Jun. 15, 2023 (22 pages).
(Continued)

*Primary Examiner* — Laurie A Ries
(74) *Attorney, Agent, or Firm* — Osha Bergman Watanabe & Burton LLP (57) ABSTRACT The present disclosure provides a method for selecting an annotated sample. The method includes: determining a first attribute and a second attribute of a sample characteristic; in which the first attribute is a characteristic attribute of the sample characteristic in a source field sample set, and the second attribute is a characteristic attribute of the sample characteristic in a target field sample set; and determining a target annotated sample from a plurality of candidate annotated samples of the source field sample set according to the first attribute and the second attribute; in which the target annotated sample is configured to train a classification model, the classification model includes a model for determining an emotion polarity by analyzing an input sample to be classified.

17 Claims, 5 Drawing Sheets

(56) References Cited

U.S. PATENT DOCUMENTS

| | | | |
|---|---|---|---|
| 2022/0121712 A1* | 4/2022 | Cromack | G06F 40/103 |
| 2022/0180057 A1* | 6/2022 | Garcia Santa | G06F 21/6254 |
| 2023/0077830 A1* | 3/2023 | Quan | G06V 10/776 |
| | | | 382/155 |
| 2023/0089324 A1* | 3/2023 | Nahi | G06F 40/30 |
| | | | 704/9 |

FOREIGN PATENT DOCUMENTS

| | | | | |
|---|---|---|---|---|
| CN | 106126751 A | | 11/2016 | |
| CN | 109308318 A | | 2/2019 | |
| CN | 109684478 A | * | 4/2019 | G06F 16/35 |
| CN | 110472244 A | * | 11/2019 | |
| CN | 111460812 A | | 7/2020 | |
| CN | 111461180 A | | 7/2020 | |
| CN | 112015896 A | | 12/2020 | |
| CN | 112199505 A | | 1/2021 | |
| CN | 112926621 A | | 6/2021 | |
| CN | 113312899 A | | 8/2021 | |
| CN | 113516185 A | | 10/2021 | |
| CN | 113642659 A | | 11/2021 | |
| CN | 114020879 A | | 2/2022 | |
| EP | 3923160 A1 | | 12/2021 | |
| WO | 2018045910 A1 | | 3/2018 | |
| WO | 2019200806 A1 | | 10/2019 | |

OTHER PUBLICATIONS

"Chi-square test for text classification;" Jun. 11, 2020; p. 1; Retrieved from the Internet: URL: https://blog.csdn.net/qq39303465/article/details/79223843 (3 pages).

Zhang et al.; "Cross-domain Sentiment Classification Based on Optimizing Classification Model Progressively;" Computer Science; vol. 43; No. 7 ; Jul. 2016; pp. 234-239 (6 pages).

"Natural Language Processing (NLP) semantic analysis—text classification, sentiment analysis, intention recognition;" May 28, 2020; Retrieved from the Internet: URL: https://blog.csdn.net/weixin41657760/article/details/93163519 (24 pages).

Wang et al.; "Overview on Sentiment Analysis of Microblog;" Computer Engineering & Science; vol. 44; No. 1; Jan. 2022; pp. 166-175 (11 pages).

Jun et al.; "Public opinion analysis and emotion analysis based on text mining;" Information Recording Materials; vol. 23; Issue 2; Feb. 2022; pp. 163-166 (12 pages).

Jiawa et al.; "Review of Methods and Applications of Text Sentiment Analysis;" Data Analysis and Knowledge Discovery; vol. 5; Issue 6; Jun. 2021; pp. 1-13 (13 pages).

* cited by examiner

METHOD FOR SELECTING ANNOTATED SAMPLE, APPARATUS, ELECTRONIC DEVICE AND STORAGE MEDIUM

CROSS-REFERENCE TO RELATED APPLICATION

This application claims priority to Chinese Patent Application No. 202210122790.5, filed on Feb. 9, 2022, the entire disclosure of which is incorporated herein by reference.

FIELD

This disclosure relates to the field of computer technology, in particular to the field of artificial intelligence and deep learning technologies.

BACKGROUND

Emotion analysis is a process of analyzing, processing, summarizing and applying texts with emotional colors. The use of deep learning technology for emotion analysis has become a major driving force in the field of emotion analysis technology. Deep learning requires a large number of annotated data for modeling training. However, due to the extensive application of emotion analysis, the emotion analysis system may adapt to many different fields, relying on manual annotation of enough data for each field, which greatly increases the labor cost and time cost of data annotation.

Therefore, how to build an emotion analysis system for a target field based on annotated data in a source field and reduce the cost and time of data annotation has become a problem to be solved.

SUMMARY

According to an aspect of the present disclosure, a method for selecting an annotated sample is provided. The method includes:

determining a first attribute and a second attribute of a sample characteristic; in which the first attribute is a characteristic attribute of the sample characteristic in a source field sample set, and the second attribute is a characteristic attribute of the sample characteristic in a target field sample set; and determining a target annotated sample from a plurality of candidate annotated samples of the source field sample set according to the first attribute and the second attribute; in which the target annotated sample is configured to train a classification model, the classification model includes a model for determining an emotion polarity by analyzing an input sample to be classified.

According to another aspect of the present disclosure, an electronic device is provided. The electronic device includes:

at least one processor; and a memory communicatively connected with the at least one processor;

the memory stores instructions that can be executed by the at least one processor, and the instructions are executed by the at least one processor to enable the at least one processor to execute the method in any embodiment of the present disclosure.

According to another aspect of the present disclosure, a non-transitory computer readable storage medium has computer instructions stored thereon is provided. The computer instructions are configured to cause a computer to execute the method in any embodiment of the present disclosure.

According to another aspect of the present disclosure, a computer program product is provided. The computer program product includes a computer program. When the computer program is performed by a processor, the method in any embodiment of the present disclosure is implemented.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
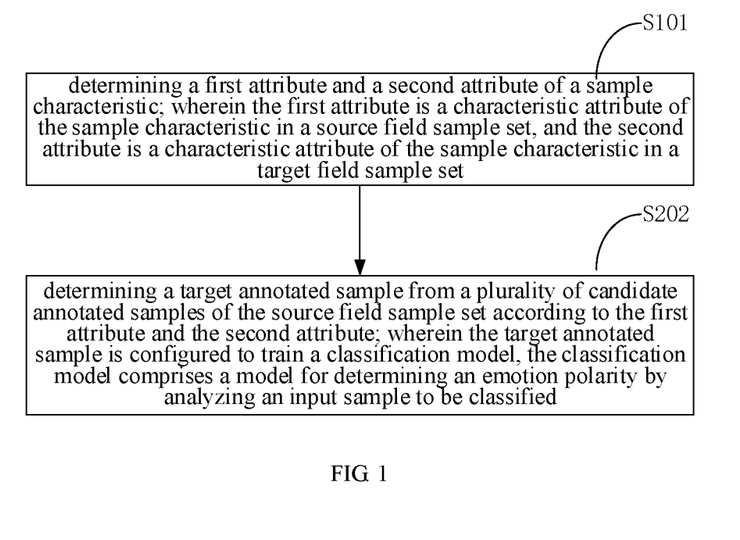
FIG. 1 is a flowchart of a method for selecting a target annotated sample according to an embodiment of the present disclosure.

As illustrated in FIG. 1, the present disclosure relates to a method for selecting an annotated sample, which may include the following steps:

S101, a first attribute and a second attribute of a sample characteristic are determined; the first attribute is a characteristic attribute of the sample characteristic in a source field sample set, and the second attribute is a characteristic attribute of the sample characteristic in a target field sample set.

S102, a target annotated sample is determined from a plurality of candidate annotated samples of the source field sample set according to the first attribute and the second attribute; the target annotated sample is configured to train a classification model, the classification model is configured to analyzing an emotion polarity.

The embodiment can be performed by a server, specifically one of a variety of servers, such as a desktop computer, a laptop, a cloud calculator or a server set composed of multiple servers. The disclosure does not limit the product type of the server.

A sample can be text information with specific semantics, such as Chinese text, English text, etc., which is not limited here. The length of the text can be set as needed, for example, the text can be a statement or a paragraph that meets a specific word count requirement. Based on the semantic information of the sample, a corresponding emotion polarity of the sample can be determined, such as positive, negative, neutral, etc. Accordingly, based on the emotion polarity of samples, a sample set can be divided into positive samples, negative samples, neutral samples, etc.

The source field sample set and the target field sample set can be sets of samples from different fields. The different fields can include the news field, the sports field, the literature field, the technology field, the industry field, etc., which is not listed exhaustively. The samples in the source field sample set are all annotated samples, and the samples in the target field sample set are unannotated samples.

The sample characteristic can be a characteristic word in the sample, such as a word, a word group, phrase, etc., which is used to represent common information in the sample set. One or more sample characteristics can be included in the same sample. The semantic information represented by the same sample characteristic in different field sample sets may be different. For example, in a sample set of the computer field, a sample characteristic "fast" is selected, which may represent the semantic information that the computer runs fast, so the emotion polarity of "fast" is positive. In the battery field, the sample characteristic "fast" is also selected, which may represent the semantic information that the battery consumes power fast, so the emotion polarity of "fast" is negative.

The same sample characteristic has different attributes in the source field and the target field. The first attribute and the second attribute are the characteristic attributes of the sample characteristic in the source field sample set and the target field sample set, respectively. Characteristic attributes can be used to represent an importance level and an emotion polarity, etc., of the sample characteristic in the field.

The first attribute of the sample characteristic in the source field and the second attribute in the target field are determined respectively. Based on the first attribute and the second attribute, the target annotated sample is determined from multiple candidate annotated samples in the source field sample set. The target annotated samples can be used to train a classification model applied to a target field.

Through the above process, the target annotated samples in the source field can be selected based on the first attribute and the second attribute, and then the selected target annotated samples can be used to train the classification model applied to the target field. In this way, cross-field emotion analysis can be realized and the cost of manual annotation is greatly reduced.

Figure 2:
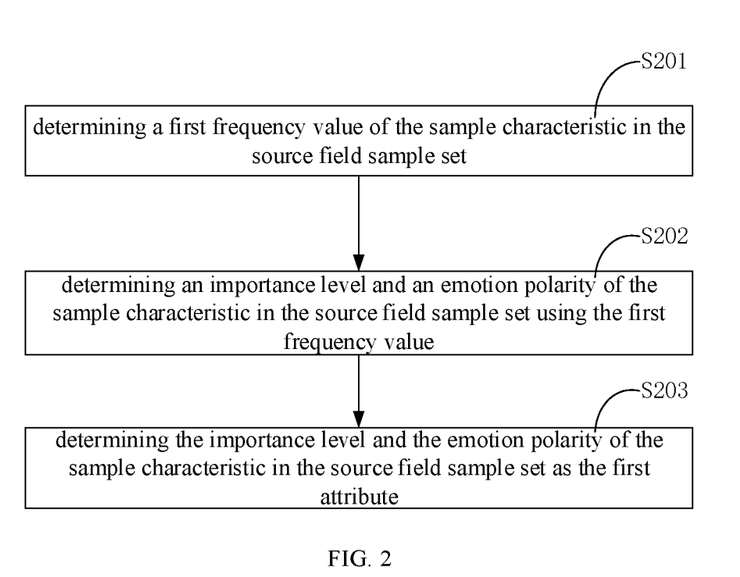
FIG. 2 is a flowchart of a method for determining a first attribute according to an embodiment of the present disclosure.

As illustrated in FIG. 2, in an embodiment, a method for determining the first attribute includes:

S201, a first frequency value of the sample characteristic in the source field sample set is determined.

S202, an importance level and an emotion polarity of the sample characteristic in the source field sample set are determined using the first frequency value.

S203, the importance level and the emotion polarity of the sample characteristic in the source field sample set are determined as the first attribute.

The first frequency value can be the number of times that the sample characteristic appears in the source field sample set, i.e., the sample set of the source field. Specifically, the first frequency value may include at least one of a first overall frequency value, a first positive frequency value and a first negative frequency value. The first overall frequency value can be a total number of times that the sample characteristic appears in the source field sample set, the first positive frequency value can be the number of times that the sample characteristic appears in a positive sample set of the source field, and the first negative frequency value can be the number of times that the sample characteristic appears in the negative sample set of the source field.

An implementation method for determining the importance level and the emotion polarity of the sample characteristic in the source field sample set by using the first frequency value may be: determining the importance level of the sample characteristic in the source field sample set according to the first overall frequency value; and determining the emotion polarity of the sample characteristic in the source field sample set according to the first positive frequency value and the first negative frequency value. For example, the importance level can be determined by: determining that the sample characteristic is important in the source field when the first overall frequency value meets a preset frequency condition. The preset frequency condition can be 5 times, 10 times, 15 times, etc., which is not exhaustively listed here. The determination method of the emotion polarity can be: when the first positive frequency value is greater than the first negative frequency value, determining that the emotion polarity of the sample characteristic in the source field is positive; and when the first positive frequency value is less than or equal to the first negative frequency value, determining that the emotion polarity of the sample characteristic in the source field is negative.

The importance level and the emotion polarity of the determined sample characteristic in the source field sample set are taken as the first attribute of the sample characteristic in the source field.

Through the above process, the importance level and the polarity of sample characteristic in the source field can be determined based on the first frequency value, and then the screening accuracy of annotated samples can be improved according to the importance level and polarity.

Figure 3:
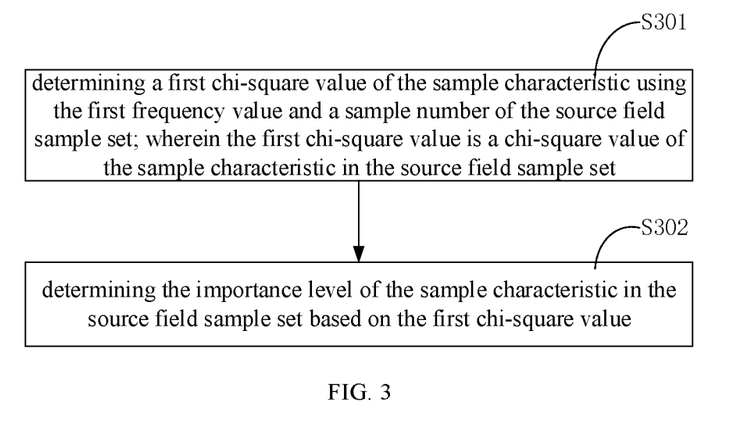
FIG. 3 is a flowchart of a method for determining a importance level of a sample characteristic according to an embodiment of the present disclosure.

As illustrated in FIG. 3, in an embodiment, step S202 may include the following sub steps:

S301, a first chi-square value of the sample characteristic is determined using the first frequency value and a sample number of the source field sample set; the first chi-square value is a chi-square value of the sample characteristic in the source field sample set.

S302, the importance level of the sample characteristic in the source field sample set is determined based on the first chi-square value.

The number of samples can include a total number of samples, a number of positive samples and a number of negative samples. Based on the number of samples, the first chi-square value of the sample characteristic can be determined according to expression (1).

$$\chi^2(F_i|D) = \frac{\left(m^- - m\frac{n^-}{n}\right)^2}{m\frac{n^-}{n}} + \frac{\left(m^+ - m\frac{n^+}{n}\right)^2}{m\frac{n^+}{n}} \quad (1)$$

Where, $F_i$ represents the $i^{th}$ sample characteristic, D represents the source field sample set, and $\chi^2(F_i|D)$ represents the chi-square value of the $i^{th}$ sample characteristic in the source field sample set, m represents the first overall frequency value, $m^+$ represents the first positive frequency value, $m^-$ represents the first negative frequency value, n represents the total number of samples, $n^+$ represents the number of positive samples, and $n^-$ represents the number of negative samples.

Determining the importance level of the sample characteristic in the source field sample set based on the first chi-square value may be: Determining the importance level of the sample characteristic in the source field sample set based on the relationship between the first chi-square value and a preset threshold. For example, when the first chi-square value is greater than the preset threshold, the importance level of sample characteristic in the source field sample set is important, otherwise it is not important. The preset threshold can be set as required. In an embodiment, the preset threshold can be selected from 3.50 to 4.00, such as 3.84, 3.91, etc., which is not be exhaustive here.

In addition, the sample characteristic can also be divided into different importance levels according to a chi-square value range. For example, when the chi-square value is 3.51-3.99, the importance level can be level 1, indicating very important. When the chi-square value is 3.01-3.50, the importance level can be level 2, indicating general importance. When the chi-square value is 2.51-2.99, the importance level can be level 3, indicating not important. The chi-square value range corresponding to different importance levels can be set as required, and will not be described here.

Through the above process, the importance level of the sample characteristic can be determined based on the calculated chi-square value, so that the annotated samples containing important characteristics can be selected for model training to improve the accuracy of model training.

Figure 4:
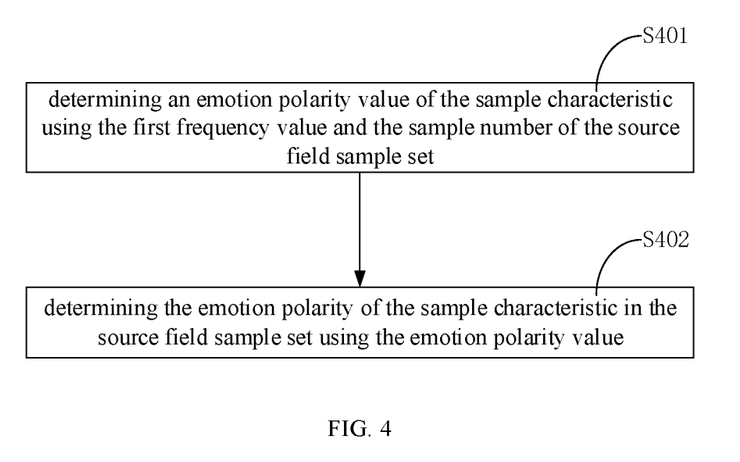
FIG. 4 is a flowchart of a method for determining an emotion polarity according to an embodiment of the present disclosure.

As illustrated in FIG. 4, in an embodiment, step S202 includes the following sub steps:

S401, an emotion polarity value of the sample characteristic is determined using the first frequency value and the sample number of the source field sample set.

S402, the emotion polarity of the sample characteristic in the source field sample set is determined using the emotion polarity value.

The method for determining the first frequency value and the sample number of the source field sample set will not be repeated. The emotion polarity value of the sample characteristic can be determined by substituting the first frequency value and the sample number of the source field sample set into the following expression (2).

$$\delta(F_i|D) = nm^+ - nm^+ \quad (2)$$

Where, $F_i$ represents the $i^{th}$ sample characteristic, $D_1$ represents the source field sample set, $\delta(F_i|D)$ represents the emotion polarity value of the $i^{th}$ sample characteristic in the source field sample set, n represents the total number of samples, $m^+$ represents the first positive frequency value, m represents the first overall frequency value, and $n^+$ represents the number of positive samples.

Determining the emotion polarity of the sample characteristic in the source field sample set by using the emotion polarity value can be: determining the emotion polarity of the sample characteristic based on the positive or negative of the emotion polarity value. For example, if the calculated value of $\delta(F_i|D)$ is positive, the emotion polarity of the sample characteristic is positive, otherwise, the emotion polarity is negative.

Through the above process, the emotion polarity of sample characteristic can be determined based on the calculated emotion polarity value, so that the sample characteristic with the same emotion polarity in the source field and target field can be selected for model training to improve the accuracy of model training.

Figure 5:
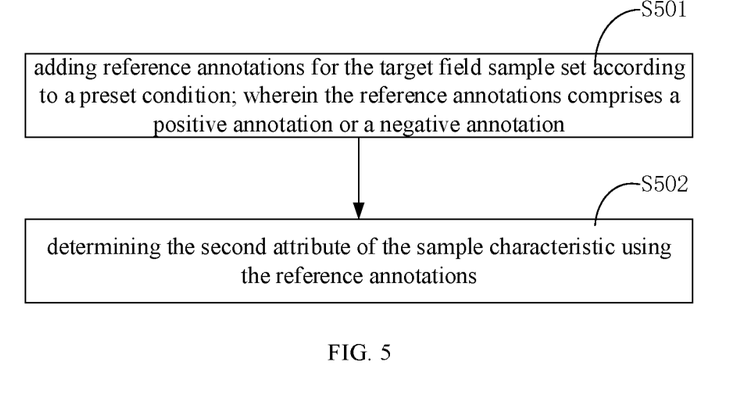
FIG. 5 is a flowchart of a method for determining a second attribute according to an embodiment of the present disclosure.

As illustrated in FIG. 5, in an embodiment, a method for determining the second attribute includes:

S501, reference annotations are added for the target field sample set according to a preset condition; the reference annotations includes a positive annotation or a negative annotation.

S502, the second attribute of the sample characteristic is determined using the reference annotations.

The reference annotations include positive annotations or negative annotations. The samples in the target field sample set are unannotated samples. The implementation method of adding reference annotations to the target field sample set can be: inputting the samples in the target field sample set into a preset model, and then using the output results (positive annotations or negative annotations) of the preset model as reference annotations of the samples. The preset model can be an emotion polarity analysis model trained using the source field sample set. The input data of the model can be a test sample of the target field, and the output data can be an emotion polarity of the test sample, such as positive or negative.

After the reference annotations are determined, the second attribute of the sample characteristic is determined using the reference annotations. The second attribute can be determined by using the number of occurrences of the sample characteristic in the target field sample set with the reference annotations.

Through the above process, preliminary reference annotations can be added to the target field sample set. Further, the second attribute of the sample characteristic can be determined based on the reference annotations. In this way, sample characteristics with the same attributes in the source field and target field can be selected for model training to improve the accuracy of model training.

Figure 6:
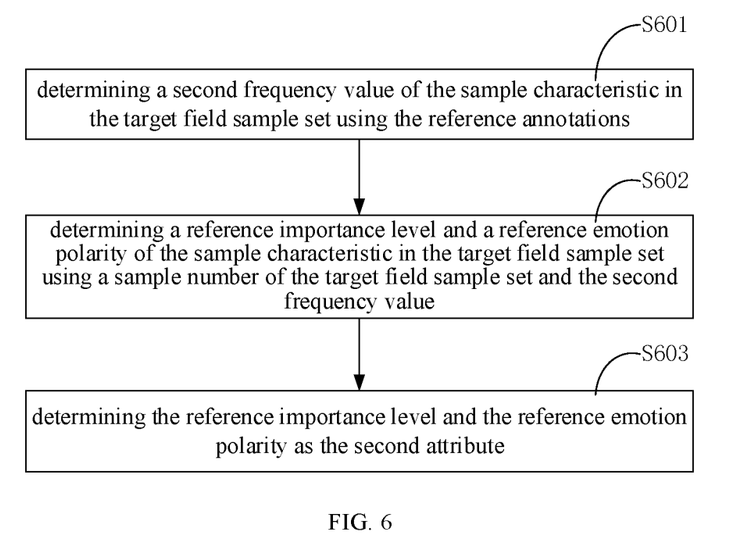
FIG. 6 is a flowchart of a method for determining a second attribute according to an embodiment of the present disclosure.

As illustrated in FIG. 6, in an embodiment, step S502 includes the following sub steps:

S601, a second frequency value of the sample characteristic in the target field sample set is determined using the reference annotations.

S602, a reference importance level and a reference emotion polarity of the sample characteristic in the target field sample set are determined using a sample number of the target field sample set and the second frequency value.

S603, the reference importance level and the reference emotion polarity are determined as the second attribute.

The target field sample set is divided into positive samples and negative samples based on the reference annotations, and then the number of positive samples and the number of negative samples in the target field sample set, the number of times that the sample characteristic appears in the positive samples, and the number of times that the sample characteristic appears in the negative samples can be determined. In this way, Referring to step S201-S203, the second frequency value, the reference importance level and the reference polarity of the sample characteristic in the target field sample set can be determined, and the reference importance level and the reference polarity are determined as the second attribute, which will not be repeated here.

Through the above process, the reference importance level and the reference polarity of the sample characteristic in the target field can be determined based on the second frequency value, and then the screening accuracy of the annotated samples can be improved according to the reference importance level and the reference polarity.

Figure 7:
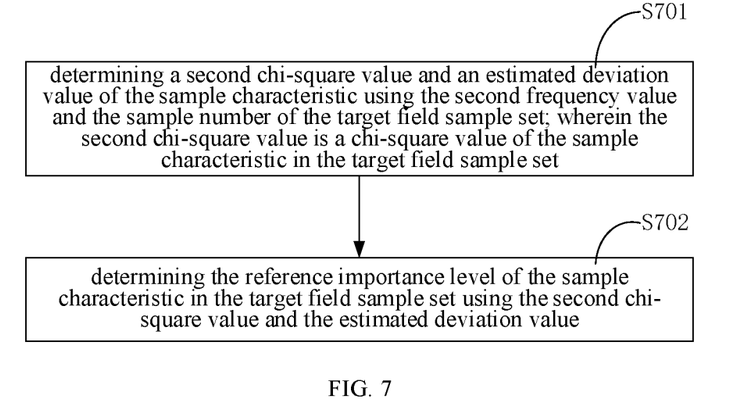
FIG. 7 is a flowchart of a method for determining a reference importance level according to an embodiment of the present disclosure.

As illustrated in FIG. 7, in an embodiment, a method for determining the reference importance level includes:

S701, a second chi-square value and an estimated deviation value of the sample characteristic are determined using the second frequency value and the sample number of the target field sample set; the second chi-square value is a chi-square value of the sample characteristic in the target field sample set.

S702, the reference importance level of the sample characteristic in the target field sample set is determined using the second chi-square value and the estimated deviation value.

Based on the reference annotations, the total number of samples, the number of positive samples and the number of negative samples in the target field sample set can be determined, and then the second chi-square value of the sample characteristic can be determined according to expression (3).

$$\chi^2(F_i|\hat{D}_T) = \frac{\left(\hat{m}^- - \hat{m}\frac{n^-}{\hat{n}}\right)^2}{\hat{m}\frac{\hat{n}^-}{\hat{n}}} + \frac{\left(\hat{m}^+ - \hat{m}\frac{\hat{n}^+}{\hat{n}}\right)^2}{\hat{m}\frac{\hat{n}^+}{\hat{n}}} \quad (3)$$

Where, $F_i$, represents $i^{th}$ sample characteristic, $\hat{D}_T$ represents the target field sample set after adding the reference annotations, $X_2(F_i|\hat{D}_T)$ represents the second chi-square value, $\hat{m}$ represents the second overall frequency value, $\hat{m}^+$ represents the second positive frequency value, $\hat{m}^-$ represents the second negative frequency value, $\hat{n}$ represents the total number of samples, $\hat{n}^+$ represents the number of positive samples, and $\hat{n}^-$ represents the number of negative samples.

The estimated deviation value can be a value obtained by estimating the deviation between an actual chi-square value and the second chi-square value of the sample characteristic in the target field. The estimated deviation value can be calculated from a first parameter value and a second parameter value. The first parameter value can be calculated according to the following expression (4).

$$p \leftarrow \frac{1}{|D_T|} \sum_{x \in D_T} \max_i p(y = i|x; f_s) \quad (4)$$

Where, p represents the first parameter value, $D_T$ represents the target field sample set without reference annotations, $|D_T|$ represents the number of samples in the target field sample set, and $p(y=i|x;f_s)$ represents a probability value of annotation prediction for the $i^{th}$ sample using the $f_s$ model.

The second parameter value can be calculated according to the following expression (5).

$$\hat{\alpha} = \frac{\hat{n}^+}{\hat{n} - \hat{n}^+} \quad (5)$$

Where, $\hat{\alpha}$ represents the second parameter value, $\hat{n}$ represents the total number of samples, and $\hat{n}^+$ represents the number of positive samples.

After the first parameter value p and the second parameter value $\hat{\alpha}$ are determined, they can be substituted into expression (6) to calculate the estimated deviation value.

$$\lambda = \frac{\hat{\alpha}}{\hat{\alpha} + (1 + \hat{\alpha})^2(p^2 - p)} \quad (6)$$

Where, $\lambda$ represents the estimated deviation value, p represents the first parameter value, and $\hat{\alpha}$ represents the second parameter value.

The reference importance level of the sample characteristic in the target field sample set can be determined by: using the second chi-square value and the estimated deviation value to determine the actual chi-square value of the sample characteristic in the target field, and then using the actual chi-square value to determine the reference importance level of the sample characteristic in the target field sample set. The actual chi-square value of the sample characteristic in the target field sample set can be calculated according to the following expression (7).

$$x^2(F_i|D_T) \leftarrow \lambda \cdot x^2(F_i|\hat{D}_T) \quad (7)$$

Where, $x^2(F_i|D_T)$ represents the actual chi-square value of the $i^{th}$ sample characteristic in the target field sample set, $\lambda$ represents the estimated deviation value, and $x^2(F_i|\hat{D}_T)$ represents the second chi-square value.

Through the above process, the accuracy of determining the importance level of sample characteristic can be improved based on statistical methods, which helps to improve the accuracy of annotated sample selection.

Figure 8:
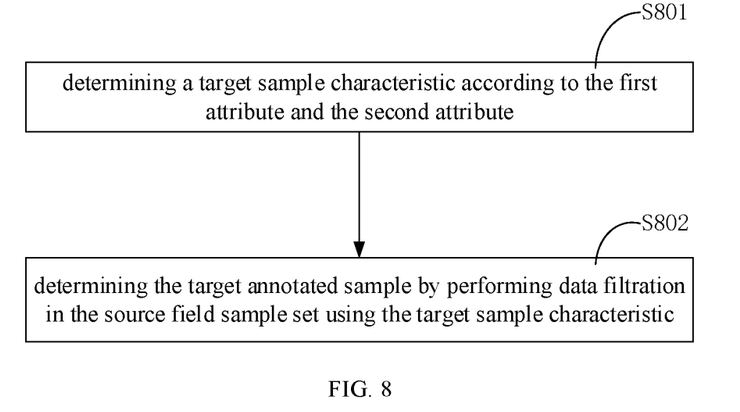
FIG. 8 is a flowchart of a method for determining a target annotated sample selection according to an embodiment of the present disclosure.

As shown in FIG. 8, in an embodiment, step S102 includes the following sub steps:

S801, a target sample characteristic is determined according to the first attribute and the second attribute.

S802, the target annotated sample is determined by performing data filtration in the source field sample set using the target sample characteristic.

Using the first attribute and the second attribute of the sample characteristic in the source field and target field to determine whether the sample characteristic is the target sample characteristic. The target sample characteristic can have one or more. The way to determine the target annotation sample by using the target sample characteristic can be: selecting annotated samples containing a preset number of target sample characteristics from the source field sample set as the target annotation samples. The preset number can be 1, 2, 3, etc. There is no limit here.

A way to determine the target annotated sample can also be: scoring the annotated samples based on the number of target sample characteristic included, and determining the annotated sample meeting a scoring threshold as the target annotated sample. The more the target sample characteristics included in the annotated sample, the higher the score of the corresponding annotated sample. The score threshold can be set as needed, and is not limited here.

Through the above process, the annotated samples containing as many target sample characteristics as possible can be filtered, so as to improve the accuracy of the selected target annotated samples.

Figure 9:
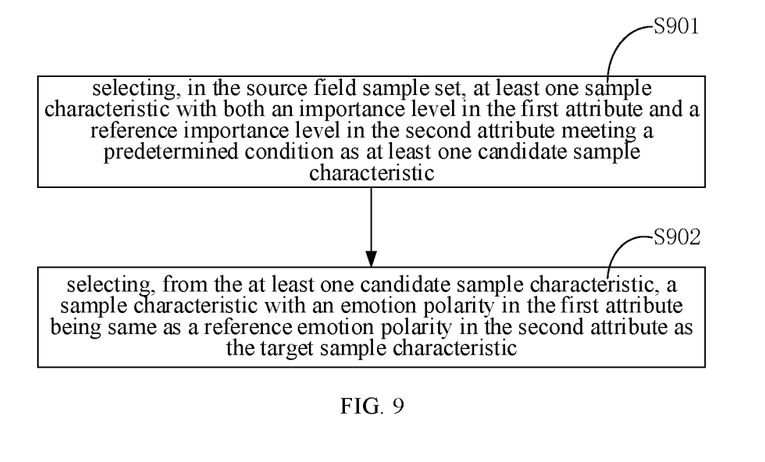
FIG. 9 is a flowchart of a method for determining a target sample characteristic according to an embodiment of the present disclosure.

As shown in FIG. 9, in one embodiment, step S801 includes the following sub steps:

S901, in the source field sample set, at least one sample characteristic with both an importance level in the first attribute and a reference importance level in the second attribute meeting a predetermined condition is selected as at least one candidate sample characteristic.

S902, a sample characteristic with an emotion polarity in the first attribute being same as a reference emotion polarity in the second attribute is selected as the target sample characteristic from the at least one candidate sample characteristic.

First, candidate sample characteristics are selected in the source field sample set based on the importance dimension. In detail, the predetermined condition can be that the importance level in the first attribute and the reference importance level in the second attribute are both "important", or the importance levels are both higher than a preset level. The preset level can be set as Level 1 (very important) or Level 2 (generally important), which can be set as required. Thus the candidate sample characteristics determined are important sample characteristics in both the source field and the target field.

On this basis, the sample characteristic with an emotion polarity in the first attribute being the same as the reference emotion polarity in the second attribute are further selected as the target sample characteristics. For example, the emotion polarities of candidate sample characteristics "fast" and "high" in the source field are both positive, while the reference emotion polarities of "fast" and "high" in the target field are positive and negative, respectively. Then "fast" can be used as the target sample characteristic, and "high" cannot be used as the target sample characteristic.

Through the above process, target sample characteristics that are both important and have the same emotion polarity can be selected from the source field and target field, and then the target samples selected by using the target sample characteristics can be used to train the emotion analysis model, which greatly reduces the cost of data annotation.

Figure 10:
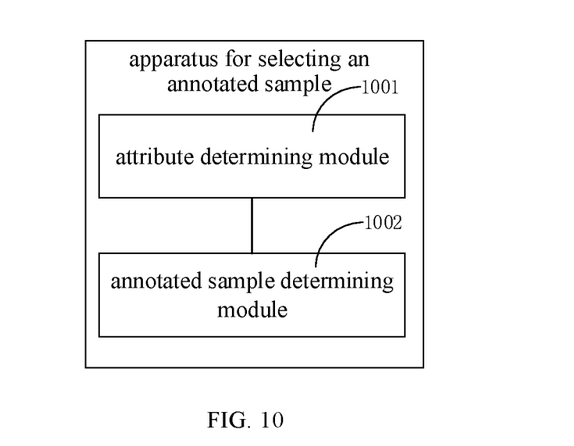
FIG. 10 is a block diagram illustrating an apparatus for selecting a target annotated sample according to an embodiment of the present disclosure.

As shown in FIG. 10, the present disclosure relates to an annotated sample selection device, which can include:

an attribute determining module 1001, configured to determine a first attribute and a second attribute of a sample characteristic; wherein the first attribute is a characteristic attribute of the sample characteristic in a source field sample set, and the second attribute is a characteristic attribute of the sample characteristic in a target field sample set; and an annotated sample determining module 1002, configured to determine a target annotated sample from a plurality of candidate annotated samples of the source field sample set according to the first attribute and the second attribute; wherein the target annotated sample is configured to train a classification model, the classification model comprises a model for determining an emotion polarity by analyzing an input sample to be classified.

In an implementation, the attribute determining module 1002 comprises:

a first frequency determining sub module, configured to determine a first frequency value of the sample characteristic in the source field sample set;

a first attribute determining sub module, configured to determine an importance level and an emotion polarity of the sample characteristic in the source field sample set using the first frequency value; and a first attribute executing sub module, configured to determine the importance level and the emotion polarity of the sample characteristic in the source field sample set as the first attribute.

In an implementation, the first attribute determining sub module comprises:

a first chi-square value determining sub module, configured to determine a first chi-square value of the sample characteristic using the first frequency value and a sample number of the source field sample set; wherein the first chi-square value is a chi-square value of the sample characteristic in the source field sample set; and an importance determining sub module, configured to determine the importance level of the sample characteristic in the source field sample set based on the first chi-square value.

In an implementation, the first attribute determining sub module comprises:

an emotion polarity value determining sub module, configured to determine an emotion polarity value of the sample characteristic using the first frequency value and the sample number of the source field sample set; and an emotion polarity determining sub module, configured to determine the emotion polarity of the sample characteristic in the source field sample set using the emotion polarity value.

In an implementation, the attribute determining module comprises:

a reference annotation determining sub module, configured to add reference annotations for the target field sample set according to a preset condition; wherein the reference annotations comprises a positive annotation or a negative annotation; and a second attribute determining sub module, configured to determine the second attribute of the sample characteristic using the reference annotations.

In an implementation, the second attribute determining sub module comprises:

a second frequency determining sub module, configured to determine a second frequency value of the sample characteristic in the target field sample set using the reference annotations;

a second attribute determining sub module, configured to determine a reference importance level and a reference emotion polarity of the sample characteristic in the target field sample set using a sample number of the target field sample set and the second frequency value; and a second attribute executing sub module, configured to determine the reference importance level and the reference emotion polarity as the second attribute.

In an implementation, the second attribute executing sub module comprises:

a second chi-square value determining sub module, configured to determine a second chi-square value and an estimated deviation value of the sample characteristic using the second frequency value and the sample number of the target field sample set; wherein the second chi-square value is a chi-square value of the sample characteristic in the target field sample set; and a reference importance determining sub module, configured to determine the reference importance level of the sample characteristic in the target field sample set using the second chi-square value and the estimated deviation value.

In an implementation, the annotated sample determining module comprises:

a target sample characteristic determining sub module, configured to determine a target sample characteristic according to the first attribute and the second attribute; and a target annotated sample determining sub module, configured to determine the target annotated sample by performing data filtration in the source field sample set using the target sample characteristic.

In an implementation, the target sample characteristic determining sub module comprises:

a candidate sample characteristic selecting sub module, configured to select, in the source field sample set, at least one sample characteristic with both an importance level in the first attribute and a reference importance level in the second attribute meeting a predetermined condition as at least one candidate sample characteristic; and a target sample characteristic executing sub module, configured to select, from the at least one candidate sample characteristic, a sample characteristic with an emotion polarity in the first attribute being same as a reference emotion polarity in the second attribute as the target sample characteristic.

With the technical solution of the present disclosure, the cost of manual annotation of samples in the target field is greatly reduced, and the ability of cross-field migration of annotation data is improved.

The collection, storage, use, processing, transmission, provision and disclosure of the personal information of users involved in the technical solutions of the disclosure are handled in accordance with relevant laws and regulations and are not contrary to public order and morality.

According to the embodiments of the disclosure, the disclosure provides an electronic device, and a readable storage medium and a computer program product.

Figure 11:
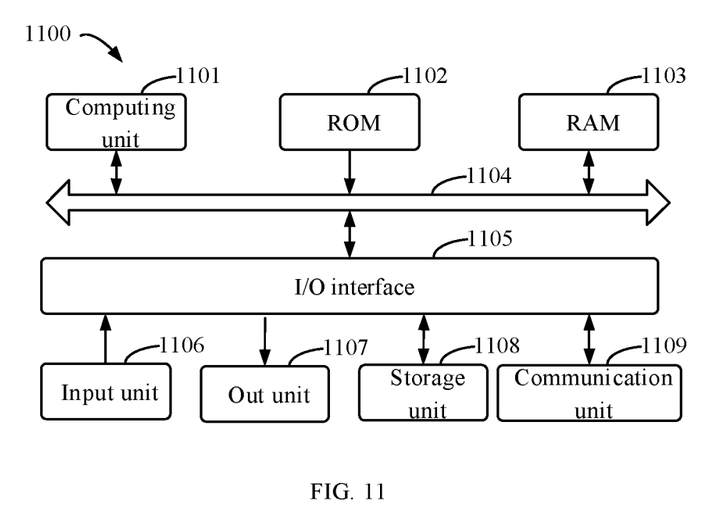
FIG. 11 is a schematic diagram illustrating an electronic device for implementing a method for selecting an annotated sample according to an embodiment of the present disclosure.

FIG. 11 is a block diagram of an example electronic device 1100 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 11, the electronic device 1100 includes: a computing unit 1101 performing various appropriate actions and processes based on computer programs stored in a read-only memory (ROM) 1102 or computer programs loaded from the storage unit 1108 to a random access memory (RAM) 1103. In the RAM 1103, various programs and data required for the operation of the device 1100 are stored. The computing unit 1101, the ROM 1102, and the RAM 1103 are connected to each other through a bus 1104. An input/output (I/O) interface 1105 is also connected to the bus 1104.

Components in the device 1100 are connected to the I/O interface 1105, including: an inputting unit 1106, such as a keyboard, a mouse; an outputting unit 1107, such as various types of displays, speakers; a storage unit 1108, such as a disk, an optical disk; and a communication unit 1109, such as network cards, modems, and wireless communication transceivers. The communication unit 1109 allows the device 1100 to exchange information/data with other devices through a computer network such as the Internet and/or various telecommunication networks.

The computing unit 1101 may be various general-purpose and/or dedicated processing components with processing and computing capabilities. Some examples of computing unit 1101 include, but are not limited to, a CPU, a graphics processing unit (GPU), various dedicated AI computing chips, various computing units that run machine learning model algorithms, and a digital signal processor (DSP), and any appropriate processor, controller and microcontroller. The computing unit 1101 executes the various methods and processes described above, such as the data reading method. For example, in some embodiments, the above method may be implemented as a computer software program, which is tangibly contained in a machine-readable medium, such as the storage unit 1108. In some embodiments, part or all of the computer program may be loaded and/or installed on the device 1100 via the ROM 1102 and/or the communication unit 1109. When the computer program is loaded on the RAM 1103 and executed by the computing unit 1101, one or more steps of the method described above may be executed. Alternatively, in other embodiments, the computing unit 1101 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for selecting an annotated sample, comprising:
   determining a first attribute and a second attribute of a sample characteristic; wherein the first attribute is a characteristic attribute of the sample characteristic in a source field sample set, and the second attribute is a characteristic attribute of the sample characteristic in a target field sample set; and
   determining a target annotated sample from a plurality of candidate annotated samples of the source field sample set according to the first attribute and the second attribute; wherein the target annotated sample is configured to train a classification model, the classification model comprises a model for determining an emotion polarity by analyzing an input sample to be classified;
   wherein determining the first attribute comprises:
   determining a first frequency value of the sample characteristic in the source field sample set;
   determining an importance level and an emotion polarity of the sample characteristic in the source field sample set using the first frequency value; and
   determining the importance level and the emotion polarity of the sample characteristic in the source field sample set as the first attribute.

2. The method as claimed in claim 1, wherein determining the importance level of the sample characteristic in the source field sample set using the first frequency value comprises:
   determining a first chi-square value of the sample characteristic using the first frequency value and a sample number of the source field sample set; wherein the first chi-square value is a chi-square value of the sample characteristic in the source field sample set; and
   determining the importance level of the sample characteristic in the source field sample set based on the first chi-square value.

3. The method as claimed in claim 2, wherein determining the emotion polarity of the sample characteristic in the source field sample set using the first frequency value comprises:
   determining an emotion polarity value of the sample characteristic using the first frequency value and the sample number of the source field sample set; and
   determining the emotion polarity of the sample characteristic in the source field sample set using the emotion polarity value.

4. The method as claimed in claim 1, wherein determining the second attribute comprises:
   adding reference annotations for the target field sample set according to a preset condition; wherein the reference annotations comprises a positive annotation or a negative annotation; and
   determining the second attribute of the sample characteristic using the reference annotations.

5. The method as claimed in claim 4, wherein determining the second attribute of the sample characteristic using the reference annotation comprises:
   determining a second frequency value of the sample characteristic in the target field sample set using the reference annotations;
   determining a reference importance level and a reference emotion polarity of the sample characteristic in the target field sample set using a sample number of the target field sample set and the second frequency value; and determining the reference importance level and the reference emotion polarity as the second attribute.

6. The method as claimed in claim 5, wherein determining the reference importance level comprises:
determining a second chi-square value and an estimated deviation value of the sample characteristic using the second frequency value and the sample number of the target field sample set; wherein the second chi-square value is a chi-square value of the sample characteristic in the target field sample set; and
determining the reference importance level of the sample characteristic in the target field sample set using the second chi-square value and the estimated deviation value.

7. The method as claimed in claim 1, wherein determining the target annotated sample from the plurality of candidate annotated samples of the source field sample set according to the first attribute and the second attribute comprises:
determining a target sample characteristic according to the first attribute and the second attribute; and
determining the target annotated sample by performing data filtration in the source field sample set using the target sample characteristic.

8. The method as claimed in claim 7, wherein determining the target sample characteristic according to the first attribute and the second attribute comprises:
selecting, in the source field sample set, at least one sample characteristic with both an importance level in the first attribute and a reference importance level in the second attribute meeting a predetermined condition as at least one candidate sample characteristic; and
selecting, from the at least one candidate sample characteristic, a sample characteristic with an emotion polarity in the first attribute being same as a reference emotion polarity in the second attribute as the target sample characteristic.

9. An electronic device, comprising:
at least one processor; and
a memory communicatively coupled to the at least one processor; wherein,
the memory stores instructions executable by the at least one processor, the instructions are executed by the at least one processor to cause the at least one processor to implement a method for selecting an annotated sample, comprising:
determining a first attribute and a second attribute of a sample characteristic; wherein the first attribute is a characteristic attribute of the sample characteristic in a source field sample set, and the second attribute is a characteristic attribute of the sample characteristic in a target field sample set; and
determining a target annotated sample from a plurality of candidate annotated samples of the source field sample set according to the first attribute and the second attribute; wherein the target annotated sample is configured to train a classification model, the classification model comprises a model for determining an emotion polarity by analyzing an input sample to be classified;
wherein determining the first attribute comprises:
determining a first frequency value of the sample characteristic in the source field sample set;
determining an importance level and an emotion polarity of the sample characteristic in the source field sample set using the first frequency value; and
determining the importance level and the emotion polarity of the sample characteristic in the source field sample set as the first attribute.

10. The electronic device as claimed in claim 9, wherein determining the importance level of the sample characteristic in the source field sample set using the first frequency value comprises:
determining a first chi-square value of the sample characteristic using the first frequency value and a sample number of the source field sample set; wherein the first chi-square value is a chi-square value of the sample characteristic in the source field sample set; and
determining the importance level of the sample characteristic in the source field sample set based on the first chi-square value.

11. The electronic device as claimed in claim 10, wherein determining the emotion polarity of the sample characteristic in the source field sample set using the first frequency value comprises:
determining an emotion polarity value of the sample characteristic using the first frequency value and the sample number of the source field sample set; and
determining the emotion polarity of the sample characteristic in the source field sample set using the emotion polarity value.

12. The electronic device as claimed in claim 9, wherein determining the second attribute comprises:
adding reference annotations for the target field sample set according to a preset condition; wherein the reference annotations comprises a positive annotation or a negative annotation; and
determining the second attribute of the sample characteristic using the reference annotations.

13. The electronic device as claimed in claim 12, wherein determining the second attribute of the sample characteristic using the reference annotation comprises:
determining a second frequency value of the sample characteristic in the target field sample set using the reference annotations;
determining a reference importance level and a reference emotion polarity of the sample characteristic in the target field sample set using a sample number of the target field sample set and the second frequency value; and
determining the reference importance level and the reference emotion polarity as the second attribute.

14. The electronic device as claimed in claim 13, wherein determining the reference importance level comprises:
determining a second chi-square value and an estimated deviation value of the sample characteristic using the second frequency value and the sample number of the target field sample set; wherein the second chi-square value is a chi-square value of the sample characteristic in the target field sample set; and
determining the reference importance level of the sample characteristic in the target field sample set using the second chi-square value and the estimated deviation value.

15. The electronic device as claimed in claim 9, wherein determining the target annotated sample from the plurality of candidate annotated samples of the source field sample set according to the first attribute and the second attribute comprises:
determining a target sample characteristic according to the first attribute and the second attribute; and
determining the target annotated sample by performing data filtration in the source field sample set using the target sample characteristic.

16. The electronic device as claimed in claim 15, wherein determining the target sample characteristic according to the first attribute and the second attribute comprises:
- selecting, in the source field sample set, at least one sample characteristic with both an importance level in the first attribute and a reference importance level in the second attribute meeting a predetermined condition as at least one candidate sample characteristic; and
- selecting, from the at least one candidate sample characteristic, a sample characteristic with an emotion polarity in the first attribute being same as a reference emotion polarity in the second attribute as the target sample characteristic.

17. A non-transitory computer-readable storage medium having computer instructions stored thereon, wherein the computer instructions are configured to cause a computer to implement a method for selecting an annotated sample, comprising:
- determining a first attribute and a second attribute of a sample characteristic; wherein the first attribute is a characteristic attribute of the sample characteristic in a source field sample set, and the second attribute is a characteristic attribute of the sample characteristic in a target field sample set; and
- determining a target annotated sample from a plurality of candidate annotated samples of the source field sample set according to the first attribute and the second attribute; wherein the target annotated sample is configured to train a classification model, the classification model comprises a model for determining an emotion polarity by analyzing an input sample to be classified;
- wherein determining the first attribute comprises:
- determining a first frequency value of the sample characteristic in the source field sample set;
- determining an importance level and an emotion polarity of the sample characteristic in the source field sample set using the first frequency value; and
- determining the importance level and the emotion polarity of the sample characteristic in the source field sample set as the first attribute.

\* \* \* \* \*